United States Patent
Muehlfeld

(10) Patent No.: US 9,921,086 B2
(45) Date of Patent: Mar. 20, 2018

(54) POSITION MEASUREMENT SYSTEM HAVING MATERIAL MEASURE, TRANSMITTER WINDING ARRANGEMENT, AND RECEIVER COILS, AND CALIBRATION METHOD THEREOF

(71) Applicant: Robert Bosch GmbH, Stuttgart (DE)

(72) Inventor: Johannes Muehlfeld, Wuerzburg (DE)

(73) Assignee: Robert Bosch GmbH, Stuttgart, DE (US)

(*) Notice: Subject to any disclaimer, the term of this patent is extended or adjusted under 35 U.S.C. 154(b) by 72 days.

(21) Appl. No.: 15/054,294

(22) Filed: Feb. 26, 2016

(65) Prior Publication Data

US 2016/0252376 A1 Sep. 1, 2016

(30) Foreign Application Priority Data

Feb. 26, 2015 (DE) .................. 10 2015 203 403

(51) Int. Cl.
*G01R 35/00* (2006.01)
*G01D 18/00* (2006.01)
(Continued)

(52) U.S. Cl.
CPC ............ *G01D 18/00* (2013.01); *G01D 5/20* (2013.01); *G01D 5/204* (2013.01); *G01D 5/22* (2013.01); *G01D 5/225* (2013.01)

(58) Field of Classification Search
CPC ......... G01N 33/54326; G01N 33/5434; G01N 2291/014; G01N 29/223; G01N 29/2412;
(Continued)

(56) References Cited

U.S. PATENT DOCUMENTS

| 6,011,389 A | 1/2000 | Masreliez et al. |
| 2016/0041005 A1* | 2/2016 | Shimizu ................. G01D 5/142 324/207.2 |
| 2016/0047676 A1* | 2/2016 | Reusing ............... G01D 5/2066 324/654 |

FOREIGN PATENT DOCUMENTS

| DE | 197 19 905 A1 | 11/1997 |
| DE | 198 03 249 A1 | 8/1998 |

(Continued)

OTHER PUBLICATIONS

Karki, James, Fully-Differential Amplifiers, Application Report, SLOA054D, Texas Instruments Incorporated, 28 pages, Jan. 2002.
Texas Instruments, TS5A623157, Dual 10-Ohm SPDT Analog Switch with Undershoot/Overshoot Voltage Protection, SCDS253, 25 pages, Sep. 2007.

*Primary Examiner* — Vinh Nguyen
(74) *Attorney, Agent, or Firm* — Maginot, Moore & Beck LLP

(57) ABSTRACT

A position measurement system includes a material measure and a sampling device, arranged movably with respect to one another relative to a measurement direction. The material measure includes a multiplicity of markings arranged in a row relative to the measurement direction. The sampling device includes a transmitter winding arrangement and a plurality of receiver coils. The receiver coils are arranged in a row relative to the measurement direction such that inductive coupling between the transmitter winding arrangement and the receiver coils is dependent on a position of the sampling device relative to the material measure. The sampling device further includes an operational amplifier having a first and a second output terminal. The receiver coils are connected via a switching device to the operational amplifier such that a single coil or a pair of receiver coils is configured for selective connection on an input side to the operational amplifier.

11 Claims, 2 Drawing Sheets

(51) Int. Cl.
*G01D 5/20* (2006.01)
*G01D 5/22* (2006.01)

(58) Field of Classification Search
CPC .. G01N 29/348; G01N 29/42; G01N 27/9033; G01R 33/30; G01R 33/34084; G01R 33/58; G01R 33/287; G01R 33/288; G01R 33/34007; G01R 33/3642; G01R 33/3664; G01R 33/3692; G01R 33/422; G01R 33/543; G01R 33/546; G01D 5/20; G01D 5/2497; G01D 18/00; G01D 5/2006; G01D 5/204; G01D 5/2066; G01D 5/22; G01D 5/225
See application file for complete search history.

(56) References Cited

FOREIGN PATENT DOCUMENTS

| | | |
|---|---|---|
| DE | 101 30 572 A1 | 1/2003 |
| DE | 103 52 351 A1 | 12/2004 |
| DE | 10 2007 042 796 A1 | 3/2009 |
| DE | 10 2008 018 355 A1 | 10/2009 |
| DE | 10 2009 042 940 A1 | 5/2011 |
| DE | 10 2011 106 940 A1 | 2/2012 |
| EP | 1 164 358 A1 | 12/2001 |
| FR | 2 999 363 A1 | 6/2014 |
| WO | 2011/060465 A1 | 5/2011 |

\* cited by examiner

92 — $r_n = r_1 \cdot \dfrac{M_1 + M_{n,1}}{M_n - M_{n,1}}$     $n = 2, 4, 6 \ldots N$ 93 — $r_n = r_1 \cdot \dfrac{M_1 + M_{n,2}}{M_n - M_{n,3}}$     $n = 3, 5, 7 \ldots N-1$ 94 — $i_j = 1$ 95 — $i_n = \dfrac{M_n \cdot r_n}{M_j \cdot r_j} \cdot i_j$     $n \neq j$ 96 — $C = M_{2,3} \cdot \dfrac{(r_2 + r_1)}{(i_2 - i_1)}$ 97 — $A_k = 1$ 98 — $A_{n+1} = \dfrac{i_n}{i_{n+1}} \cdot A_n - M_{n,n+3} \cdot \dfrac{r_n + r_{n+1}}{i_{n+1}} \cdot \dfrac{1}{C}$     $n = k \ldots N-1$ 99 — $A_n = \dfrac{i_{n+1}}{i_n} \cdot A_{n+1} + M_{n,n+1} \cdot \dfrac{r_n + r_{n+1}}{i_n} \cdot \dfrac{1}{C}$     $n = k-1, k-2 \ldots 1$

US 9,921,086 B2

POSITION MEASUREMENT SYSTEM HAVING MATERIAL MEASURE, TRANSMITTER WINDING ARRANGEMENT, AND RECEIVER COILS, AND CALIBRATION METHOD THEREOF

This application claims priority under 35 U.S.C. § 119 to patent application no. DE 10 2015 203 403.8, filed on Feb. 26, 2015 in Germany, the disclosure of which is incorporated herein by reference in its entirety.

The disclosure relates to a position measurement system and to a method for the operation thereof.

BACKGROUND

A position measurement system is known from DE 10 2008 018 355 A1. Furthermore, reference is made to the German patent application with the application number 10 2014 216 036.7.

SUMMARY

The present disclosure relates to a position measurement system having a material measure and a sampling device, which are arranged movably with respect to one another relative to a measurement direction. The material measure has a multiplicity of markings, which are arranged in a row relative to the measurement direction. The sampling device has a transmitter winding arrangement. Furthermore a plurality of receiver coils are provided, which are arranged in a row relative to the measurement direction in such a way that the inductive coupling between the transmitter winding arrangement and the receiver coils is dependent on the position of the sampling device relative to the material measure.

One advantage of the present disclosure is that the evaluation of the voltages induced in the receiver coils is possible without problems even when the receiver coils have different electrical properties. The receiver coils are preferably configured as planar coils, which most preferably are produced by a photochemical etching method. In this case, winding short circuits may occur because of manufacturing inaccuracies, so that the ohmic resistance and the inductance of the various receiver coils are not equal. Tolerances in relation to the thickness and width of the conductive tracks are a further consequence of manufacturing inaccuracies. Furthermore, the position measurement system is insensitive to stray external fields.

It is proposed that at least one operational amplifier having a first and a second output terminal is provided, the receiver coils being connected via a switching device to the at least one operational amplifier in such a way that a single receiver coil or a single pair of differentially interconnected receiver coils can selectively be connected on the input side to the at least one operational amplifier.

A method for operating the aforementioned position measurement system is proposed, wherein the first and the second output terminals of the at least one operational amplifier define a measurement voltage, the method successively comprising the following steps:

a) moving the sampling device into a calibration position, in which it is arranged spatially separated from the material measure, so that the material measure does not influence the inductive coupling between the transmitter winding arrangement and the receiver coils;

b) supplying the transmitter winding arrangement with an alternating current and measuring a plurality of different calibration measurement voltages $M_{n,1}$; $M_{n,2}$; $M_n$ in the calibration position of the sampling device, either a single receiver coil or a single pair of differentially interconnected receiver coils respectively being connected on the input side to the at least one operational amplifier;

c) moving the sampling device into a working position, in which it is arranged facing the material measure in such a way that the material measure influences the inductive coupling between the transmitter winding arrangement and the receiver coils;

d) supplying the transmitter winding arrangement with an alternating current and measuring a plurality of different working measurement voltages $M_{n,n+1}$ in the working position of the sampling device, a single pair of differentially interconnected receiver coils respectively being connected on the input side to the at least one operational amplifier;

e) calculating a plurality of evaluation factors $A_n$ from the calibration measurement voltages $M_{n,1}$; $M_{n,2}$; $M_n$ and the working measurement voltages $M_{n,n+1}$.

Preferably, the markings are formed by openings in a metal strip, the center spacing of the openings in the measurement direction respectively being an integer multiple of a constant first separating distance $\lambda$. Preferably, the markings encode a random number sequence, most preferably a binary random number sequence, any random selection of a number m of directly neighboring markings being different from any random other selection of a number m of directly neighboring markings. In this way, the absolute position of the sampling device relative to the material measure can be determined. Preferably, the receiver coils have a constant second separating distance $\delta$ in the measurement direction, the condition $r \times \lambda = s \times \delta$ being satisfied, where r and s are integers, for which $s > r$. In this case, for the position determination, it is not important which intermediate position the sampling device has relative to the separating grid of the material measure. The first and second output terminals are preferably connected on the input side to an analog/digital converter in order to measure the measurement voltage.

In the scope of step d, the differentially interconnected receiver coils are preferably arranged next to one another in such a way that no other receiver coil is arranged between them. In the scope of step a, the calibration position is preferably selected in such a way that the said inductive coupling is influenced only by the sampling device itself and the surrounding air. Preferably, the sampling device is screened from external electromagnetic fields in the calibration position. The evaluation factors $A_n$ may, for determining the absolute position of the sampling device relative to the material measure, be treated in precisely the same way as the induced voltages which are measured directly at ideal receiver coils. The voltage at a pair of differentially interconnected receiver coils corresponds to the mathematical difference of the corresponding evaluation factors. Preferably, the sampling device is guided relative to the material measure in a mobile fashion with respect to the measurement direction, the corresponding guide engagement most preferably being released in the calibration position.

By the operational amplifier, the weak induced voltages at the receiver coils are amplified so that, for example, they can be measured easily by an analog/digital converter. The operational amplifier is preferably arranged in the immediate spatial vicinity of the receiver coils, so that the weak induced voltages only have to be delivered over short conduction paths, as a result of which little signal interference occurs.

Because of the arrangement above, the measurement voltage is dependent not only on the position-dependent inductive coupling between the transmitter winding arrangement and the receiver coils. Rather, the ohmic resistance and the inductance of the receiver coils also have an effect on the measurement voltage. Furthermore, the measurement voltage depends on the configuration of the operational amplifier and on further parameters. Conversely, the evaluation factors $A_n$ depend almost exclusively on the marking which lies in front of the relevant receiver coil, even if some receiver coils have winding short circuits.

Provision may be made that the operational amplifier is configured fully differentially. Fully differential operational amplifiers are known from the document which could be accessed on 29 Jan. 2015 at the Internet address http://www.ti.com/lit/an/sloa054d/sloa054d.pdf. The present receiver coils can be connected in a particularly simple way to a fully differential operational amplifier, so that the high insensitivity of the latter to interference can be exploited particularly simply.

Provision may be made that the transmitter winding arrangement encloses a plurality of separate transmitter surfaces, which are arranged in a row relative to the measurement direction, at most a single receiver coil respectively being arranged in the transmitter surfaces. The effect achieved in this way is that all the receiver coils are exposed essentially to the same transmitter field in terms of magnitude. The corresponding position measurement system operates particularly reliably. Provision may be made that the markings are formed by openings in a metal strip, the markings encoding a random number sequence which is selected in such a way that, in each position of the sampling device facing the material measure, at least one receiver coil is arranged fully in front of an opening in the material measure. In the working position, said receiver coil therefore delivers a measurement voltage which corresponds very accurately to the measurement voltage in the calibration position. On the basis of this measurement voltage, the evaluation factors $A_n$ can be calculated in a particularly simple way.

Provision may be made that, in the scope of step b, a measurement of a plurality of calibration measurement voltages of a first type $M_{n,1}$ is carried out, a differential interconnection of a first reference coil of the receiver coils and a further receiver coil from a first subset of the receiver coils respectively being connected on the input side to the operational amplifier. The first reference coil is accordingly not contained in the first subset. With the calibration measurement voltages of a first type $M_{n,1}$, the evaluation factors $A_n$ can be calculated in a straightforward way, reference being made to the comments about FIG. 2 for further details.

Provision may be made that, in the scope of step b, a measurement of a plurality of calibration measurement voltages of a second type $M_{n,2}$ is carried out, a differential interconnection of a second reference coil of the receiver coils and a further receiver coil from a second subset of the receiver coils respectively being connected on the input side to the operational amplifier, the first reference coil being different from the second reference coil, the first subset being different from the second subset. The second reference coil may be contained in the first subset. With the calibration measurement voltages of a second type $M_{n,2}$, the evaluation factors $A_n$ can be calculated in a straightforward way, reference being made to the comments about FIG. 2 for further details.

Provision may be made that the receiver coils are respectively assigned alternately to the first or second subset as seen in the measurement direction.

Provision may be made that no other receiver coil is arranged between the first and second reference coils in the measurement direction.

Provision may be made that no other receiver coil is arranged between the first reference coil and a receiver coil of the first subset, no other receiver coil being arranged between the second reference coil and a receiver coil of the second subset.

Provision may be made that, in the scope of step e, a starting receiver coil is initially determined, this being the receiver coil which most ideally is arranged facing an opening in the material measure, the calculation being carried out on the basis of a working measurement voltage $M_{n,n+1}$ which is assigned to the starting receiver coil.

It is to be understood that the features mentioned above and those yet to be explained below may be used not only in the combination respectively indicated, but also in other combinations or individually, without departing from the scope of the present disclosure.

The disclosure will be explained in more detail below with the aid of the appended drawings, in which:

BRIEF DESCRIPTION OF THE DRAWINGS

FIG. 2 shows a plurality of mathematical formulae, with which the evaluation factors $A_n$ can be determined from the measurement voltages $M_{n,1}$; $M_{n,2}$; $M_n$, $M_{n,n+1}$.

DETAILED DESCRIPTION

Figure 1:
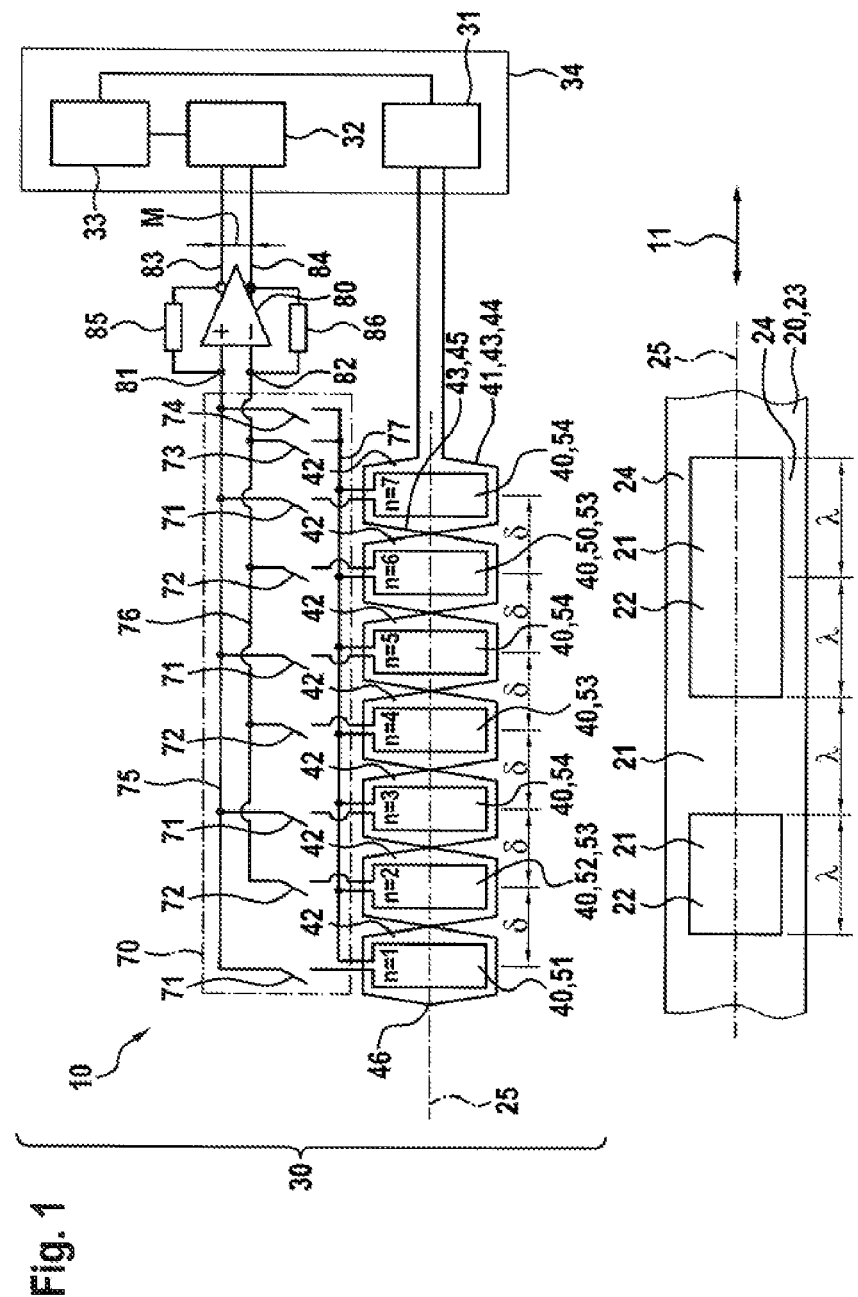
FIG. 1 shows a rough schematic representation of a position measurement system according to the disclosure.

FIG. 1 shows a rough schematic representation of a position measurement system 10 according to the disclosure. The position measurement system 10 comprises a material measure 20 and an evaluation device 30. The material measure 20 is configured as a metal strip 23, which consists for example of stainless steel, it having for example a constant thickness of 0.3 mm. The material measure 20 extends with a constant width in a measurement direction 11. Along the measurement direction 11, a multiplicity of markings 21 are arranged in a row on the material measure 20, which have a constant first separating distance 2. The markings 21 may in the present case have two states, in the first case there being an opening in the metal strip 23, and in the second case there being no opening in the metal strip 23. The openings 22 are configured rectangularly in the present case. Two directly neighboring openings 21 in the measurement direction merge into one another without interruption. Transversely with respect to the measurement direction 11, on both sides of the openings 22, the metal strip 23 respectively has a lateral web so that a continuous material measure 20 is formed. The openings 22 are preferably configured as an air-filled free space. They may, however, also be filled with a material which is different from the material of the metal strip 23, for example with brass.

The sampling device 30 is movable relative to the material measure 20 in the measurement direction 11. Preferably, the material measure 20 is fastened on the guide rail of a linear rolling bearing, the sampling device 30 being fastened on the associated guide carriage. A corresponding linear rolling bearing is known from DE 10 2007 042 796 A1. The sampling device 30 comprises an evaluation module 34, which is preferably configured in the form of a separate electronic printed circuit board. The remaining other parts of the evaluation device 30, namely the transmitter winding arrangement 41, the receiver coils 40, the switching device 70 and the operational amplifier 80 are arranged in the immediate spatial vicinity of the material measure 20 in the working position, while the evaluation module 34 may conversely be at a larger spatial distance from the material measure 20.

The transmitter winding arrangement 41 and the receiver coils 40 are respectively configured as planar winding arrangements. Only one winding turn is respectively shown in FIG. 1, although in fact both the transmitter winding arrangement 41 and the receiver coils 40 respectively have a multiplicity of essentially parallel winding turns. In FIG. 1, a center line 25 is indicated both in the transmitter winding arrangement 41 and in the material measure 20. Unlike in the representation in FIG. 1, in a working position of the position measurement system 10 these two center lines 25 lie congruently above one another, the transmitter winding arrangement 41 and the receiver coils 40 being arranged at a short distance from the material measure 20. The material measure 20 therefore influences the inductive coupling between the transmitter winding arrangement 41 and the receiver coils 40.

The transmitter winding arrangement 41 is presently configured as a meander structure, it joining a plurality of separate transmitter surfaces 42 which are arranged in a row in the measurement direction 11. The transmitter winding arrangement 41 comprises a first and a second group 44; 45 of conductive tracks 43 shaped as undulating lines, which cross one another repeatedly along the measurement direction 11. At the position denoted by No. 46, said conductive tracks 43 are connected to one another in such a way that the transmitter winding arrangement 41 is formed by a single continuous conductive track. Because of manufacturing defects, however, it may occur that there are winding short circuits. The transmitter winding arrangement 41 may, as an alternative, also be composed of a plurality of individual coils which respectively enclose a single associated transmitter surface 42, they being selectively connected in series or parallel. When the transmitter winding arrangement 41 is supplied with an alternate current by the alternating current source 31, an essentially uniform alternating electromagnetic field in terms of magnitude is formed in all the transmitter surfaces 42, the field direction being opposite in directly neighboring transmitter surfaces 42. The alternating current source 31 is preferably a component of the evaluation module 34.

In the transmitter surfaces 42, a single receiver coil 40 is respectively arranged. In spatial proximity to the receiver coils 40, the operational amplifier 80 is arranged, which is preferably configured fully differentially. The interconnection of the operational amplifier 80 is represented in a very simplified way in FIG. 1, only the two feedback resistors 85; 86 characteristic of the fully differential operational amplifier 80 being represented. The first feedback resistor 85 connects the first input terminal 81 of the operational amplifier 80 to the first output terminal 83 of the operational amplifier 80. The second feedback resistor 86 connects the second input terminal 82 of the operational amplifier 80 to the second output terminal 84 of the operational amplifier 80.

The measurement voltage M is applied to the first and second output terminals 83; 84. The first and second output terminals 83; 84 are connected on the input side to an analog/digital converter 32, so that the analog/digital converter 32 can measure the measurement voltage M. The corresponding digital value is forwarded to a programmable digital computer 32, which digitally carries out the calculations described with reference to FIG. 2. The programmable digital computer 33 and the analog/digital converter 32 are preferably a component of the evaluation module 34, being most preferably configured in the form of a microcontroller.

The first and second input terminals 81; 82 are connected by means of a switching device 70 to the various receiver coils 40. The switching device 70 comprises a first signal line 75, which is connected to the first input terminal 81 of the operational amplifier 80. Furthermore, a second signal line 76 is connected to the second input terminal 82 of the operational amplifier 80. One terminal of each receiver coil 40 is respectively connected to a third signal line 77. The respective other terminal of a receiver coil 40 is connected by means of an associated switching means 71; 72 either to the first or to the second signal line 75; 76. Preferably, each switching means 71; 72; 73; 74 has a first state in which it has a first electrical resistance, it having a second state in which it has a second electrical resistance, the second electrical resistance being at least 1000 times greater than the first electrical resistance, the at least one switching means being switchable between the first and second states. In the scope of the present application, it is assumed that a receiver coil 40 is not connected to the operational amplifier 80 in the second state of the associated switching means 71; 72. Preferably, switching means 71; 72; 73; 74 based on semiconductors are used. In this way, for example, a first electrical resistance of 0.9Ω can be achieved, it being possible to achieve a second electrical resistance which produces signal attenuation of at least 60 dB. A corresponding switching means is the subject of the data sheet which could be accessed on 23 Feb. 2015 at the Internet address http://www.ti.com/lit/ds/symlink/ts5a623157.pdf.

FIG. 1 represents by way of example 7 transmitter coils 40, each of which is denoted by an index n which increases in number along the measurement direction. It is to be understood that the position measurement system 10 may have substantially more, for example 30, receiver coils 40. The transmitter coils 40 with the indices n=1, 3, 5, 7 are respectively connected by means of a first switching means 71 to the first signal line 75. The transmitter coils 40 respectively arranged between them, with the indices n=2, 4, 6, are respectively connected by means of a second switching means 72 to the second signal line 76. The measurement voltage $M_{3,4}$ (two indices) is, for example, the measurement voltage M which is obtained when the switching means 71; 72, which are associated with the receiver coils 40 having the indices n=3 and n=4, are closed, the other switching means being open. The interconnection described above leads to the two selected receiver coils being connected together differentially, said receiver coils being connected on the input side to the operational amplifier 80. Accordingly, stray external fields which act in the same way on both said receiver coils 40, do not affect the measurement voltage $M_{3,4}$. For the correct differential interconnection of two receiver coils, the winding direction of the respective receiver coils is important, as well as which terminal is connected to the third signal line 77.

The measurement voltage $M_2$ (one index) is, for example, the measurement voltage M which is obtained when the second switching means 72, which is associated with the receiver coil 40 having the index n=2, is closed, only the fourth switching means 74 otherwise being closed. By the fourth switching means 74, the third signal line 77 is connected to the first input terminal 81 of the operational amplifier 80. Only the single receiver coil 40 having the index n=2 is therefore connected on the input side to the operational amplifier 80. When a single receiver coil 40 is intended to be used, which is connected by means of a first switching means 71 to the first signal line 75, only the third switching means 73 is otherwise closed. By means of the third switching means 73, the third signal line 77 is connected to the second input terminal 82 of operational amplifier 80.

The first to fourth switching means 71; 72; 73; 74 are preferably controlled by the programmable digital computer 33, the corresponding control lines not being represented in FIG. 1.

The calibration position of the sampling device 30 is a position in which the sampling device 30 is arranged spatially distant from the material measure 20, so that the material measure 20 does not influence the inductive coupling between the transmitter winding arrangement 41 and the receiver coils 40. If the position measurement system 10, as mentioned above, is a component of a linear rolling bearing, the guide carriages are removed from the guide rail for this purpose. In the calibration position, in the exemplary embodiment according to FIG. 1, the calibration measurement voltages of the first type $M_{2,1}$; $M_{4,1}$; $M_{6,1}$, the calibration measurement voltages of the second type $M_{3,2}$; $M_{5,2}$; $M_{7,2}$, the calibration measurement voltages of the third type $M_1$; $M_2$; $M_3$; $M_4$; $M_5$; $M_6$; $M_7$ are measured, preferably by means of the analog/digital converter 32.

The working position of the sampling device 30 is a position in which the sampling device 30 is arranged facing the material measure 20 in such a way that the material measure 20 influences the inductive coupling between the transmitter winding arrangement 41 and the receiver coils 40. In the working position, the normal position measurement thus takes place. In the working position, in the exemplary embodiment according to FIG. 1, the working measurement voltages $M_{1,2}$; $M_{2,3}$; $M_{3,4}$; $M_{4,5}$; $M_{6,7}$ are measured.

It should be noted that the receiver coils 40 with the indices n=1 and n=2 form the first and second reference coils 51; 52.

FIG. 2 shows a plurality of mathematical formulae, with which the evaluation factors $A_n$ can be determined from the measurement voltages $M_{n,1}$; $M_{n,2}$; $M_n$; $M_{n,n+1}$. With the first, second and third formula 91; 92; 93, a resistance factor $r_n$ can be calculated for each of the seven receiver coils in FIG. 1. The resistance factor $r_1$ may in principle be assigned any numerical value, the value assignment according to the first formula 91 being particularly simple to use.

With the fourth and fifth formulae 94; 95, an induction factor $i_n$ can be calculated for each of the seven receiver coils in FIG. 1. The index j in this case denotes a receiver coil arranged in the middle in relation to the measurement direction 11. In the example according to FIG. 1 the index would be j=4. In the case of an even number of receiver coils, each of the two middle indices may be used. In principle, it is even possible to use the index of an arbitrary receiver coil for j, although the calculation accuracy suffers from this. The induction factor $i_j$ may in principle be assigned any numerical value, the value assignment according to the fourth formula 94 being particularly simple to use.

With the sixth formula 96, a sensor constant C can be calculated. The calculations according to the first to sixth formulae 91-96 may already be performed after steps a and b of the method according to the disclosure have been carried out.

In the working position, index k of the receiver coil, which most ideally lies in front of an opening 22 of the material measure 20, is firstly determined. In the exemplary embodiment according to FIG. 1, this is the receiver coil 50 with the index k=6. The inductive coupling between this starting receiver coil 50 and the transmitter winding arrangement 41 is particularly poor. This behavior can be used in order to determine the starting receiver coil 50. If there are a plurality of such receiver coils, it is not important which is selected as the starting receiver coil 50.

With the seventh to ninth formulae 97; 98; 99, an evaluation factor $A_n$ can be calculated for each receiver coil. If the above selection of the starting receiver coil 50 was correct, none of the evaluation factors $A_n$ is less than one. In each case, no evaluation factor $A_n$ should be significantly less than one. If this is the case, however, a different starting receiver coil must be selected.

The evaluation factor $A_k$ may in principle be assigned any numerical value, the value assignment according to the seventh formula 97 being particularly simple to use.

The evaluation factors $A_n$ may, for determining the absolute position of the sampling device 30 relative to the material measure 20, be treated in precisely the same way as the induced voltages which are measured directly at ideal receiver coils. A corresponding method is described in the German patent application with the application number 10 2014 216 036.7, the entire content of which is referred to and made part of the content of the present applicant. In this case, it should be noted that the differential voltages used there correspond to the mathematical differences $A_i - A_j$ of the associated evaluation factors $A_n$.

REFERENCES

λ first separating distance
δ second separating distance
m length of the random code
n index of the receiver coil
N number of receiver coils
j index of the/a middle receiver coil
k index of a receiver coil which lies in front of an opening
M measurement voltage
$M_{n,1}$ calibration measurement voltage of the first type
$M_{n,2}$ calibration measurement voltage of the second type
$M_n$ calibration measurement voltage of the third type
$M_{n,n+1}$ working measurement voltage
$r_n$ resistance factor
$i_n$ induction factor
C sensor constant
$A_n$ evaluation factor
10 position measurement system
11 measurement direction
20 material measure
21 marking
22 opening
23 metal strip
24 lateral web
25 center line
30 sampling device
31 alternating current source
32 analog/digital converter
33 programmable digital computer
34 evaluation module
40 receiver coil
41 transmitter winding arrangement
42 transmitter surface
43 undulating conductive track 44 first group
45 second group
46 boundary between the two groups of undulating conductive tracks
50 starting receiver coil in front of an opening in the material measure
51 first reference coil
52 second reference coil
53 reference coil of the first subset
54 reference coil of the second subset
70 switching device
71 first switching means
72 second switching means
73 third switching means
74 fourth switching means
75 first signal line
76 second signal line
77 third signal line
80 operational amplifier
81 first input terminal of the operational amplifier
82 second input terminal of the operational amplifier
83 first output terminal of the operational amplifier
84 second output terminal of the operational amplifier
85 first feedback resistor
86 second feedback resistor
91 first formula
92 second formula
93 third formula
94 fourth formula
95 fifth formula
96 sixth formula
97 seventh formula
98 eight formula
99 ninth formula

What is claimed is:

1. A position measurement system comprising:
   a material measure having a multiplicity of markings arranged in a row along a measurement direction; and
   a sampling device that is movable with respect to the material measure along the measurement direction, the sampling device comprising:
      a transmitter winding arrangement having at least one conductor configured to enclose a plurality of transmitter surfaces arranged in a row along the measurement direction,
      a plurality of receiver coils arranged in a row along the measurement direction such that inductive coupling between the transmitter winding arrangement and the plurality of receiver coils is dependent on a position of the sampling device relative to the material measure,
      at least one operational amplifier having a first input terminal, a second input terminal, a first output terminal, and a second output terminal, and
      a switching device configured to selectively connect individual receiver coils in the plurality of receiver coils between the first and second input terminals of the operational amplifier and configured to selectively connect pairs of receiver coils in the plurality of receiver coils between the first and second input terminals of the operational amplifier in a differential series configuration.

2. The position measurement system according to claim 1, wherein the at least one operational amplifier is configured as a differential amplifier.

3. The position measurement system according to claim 1, wherein each receiver coil in the plurality of receiver coils is arranged in alignment with a respective transmitter surface in the plurality of transmitter surfaces.

4. The position measurement system according to claim 1, wherein:
   the markings are formed by openings in a metal strip, and
   the openings are arranged in the metal strip so as to encode a random number sequence.

5. A method for operating a position measurement system, the position measurement system including a material measure having a multiplicity of markings arranged in a row along a measurement direction, the position measurement system including a sampling device that is movable relative to the material measure along the measurement direction, the sampling device including (i) a transmit winding arrangement having at least one conductor configured to enclose a plurality of transmitter surfaces arranged in a row along the measurement direction, (ii) a plurality of receiver coils arranged in a row along the measurement direction such that inductive coupling between the transmitter winding arrangement and the plurality of receiver coils is dependent on a position of the sampling device relative to the material measure, (iii) at least one operational amplifier having a first input terminal, a second input terminal, a first output terminal, and a second output terminal, and (iv) a switching device configured to selectively connect individual receiver coils in the plurality of receiver coils between the first and second input terminals of the at least one operational amplifier and configured to selectively connect pairs of receiver coils in the plurality of receiver coils between the first and second input terminals of the at least one operational amplifier in a differential series configuration, the method comprising:
   a) moving the sampling device into a first position with respect to the material measure, in which the sampling device is arranged spatially separated from the material measure such that the material measure does not influence inductive coupling between the transmitter winding arrangement and the plurality of receiver coils;
   b) supplying the transmitter winding arrangement with an alternating current and measuring a plurality of different calibration measurement voltages at the first and second output terminals of the at least one operational amplifier while the sampling device is at the first position, each different calibration measurement voltage being measured while the switching device is operated to connect one of (i) a respective individual receiver coil in the plurality of receiver coils between the first and second input terminals of the at least one operational amplifier and (ii) a respective pair of receiver coils in the plurality of receiver coils between the first and second input terminals of the at least one operational amplifier in a differential series configuration;
   c) moving the sampling device into a second position, in which the sampling device is arranged facing the material measure in such that the material measure influences the inductive coupling between the transmitter winding arrangement and the plurality of receiver coils;
   d) supplying the transmitter winding arrangement with an alternating current and measuring a plurality of different working measurement voltages at the first and second output terminals of the at least one operational amplifier while the sampling device is at the second position, each different working measurement voltage being measured while the switching device is operated to connect a respective individual receiver coil in the plurality of receiver coils between the first and second input terminals of the at least one operational amplifier; and e) calculating an absolute position of the sampling device relative the material measure based on the plurality of different calibration measurement voltages and the plurality of different working measurement voltages.

6. The method according to claim 5, wherein step b further comprises:

measuring a plurality of first calibration measurement voltages at the first and second output terminals of the at least one operational amplifier, wherein each first calibration measurement voltage is measured while the switching device is operated to connect a first reference receiver coil in the plurality of receiver coils and a respective receiver coil from a first subset of the plurality of receiver coils between the first and second input terminals of the at least one operational amplifier in a differential series configuration.

7. The method according to claim 6, wherein step b further comprises:

measuring a plurality of second calibration measurement voltages at the first and second output terminals of the at least one operational amplifier, wherein each second calibration measurement voltage is measured while the switching device is operated to connect a second reference receiver coil in the plurality of receiver coils and a respective receiver coil from a second subset of the plurality of receiver coils between the first and second input terminals of the at least one operational amplifier in a differential series configuration, wherein the first reference receiver coil is different from the second reference receiver coil, and wherein the first subset is different from the second subset.

8. The method according to claim 7, wherein the plurality of receiver coils arranged along the measurement direction are alternatingly part of the first subset and the second subset.

9. The method according to claim 7, wherein no other receiver coil is arranged between the first reference receiver coil and the second reference receiver coil in the measurement direction.

10. The method according to claim 7, wherein:

no other receiver coil is arranged between the first reference receiver coil and a receiver coil of the first subset, and no other receiver coil is arranged between the second reference receiver coil and a receiver coil of the second subset.

11. The method according to claim 5, wherein step e further comprises:

identifying a working measurement voltage of the plurality of different working measurement voltages a smallest magnitude of all of the plurality of different working measurement voltages.

* * * * *